(12) United States Patent
Hartwich

(10) Patent No.: US 8,281,051 B2
(45) Date of Patent: Oct. 2, 2012

(54) METHOD AND DEVICE FOR DETERMINING TIME IN A BUS SYSTEM AND CORRESPONDING BUS SYSTEM

(75) Inventor: Florian Hartwich, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 581 days.

(21) Appl. No.: 10/489,524

(22) PCT Filed: Sep. 12, 2002

(86) PCT No.: PCT/DE02/03397
§ 371 (c)(1),
(2), (4) Date: Oct. 21, 2004

(87) PCT Pub. No.: WO03/026201
PCT Pub. Date: Mar. 27, 2003

(65) Prior Publication Data
US 2005/0066062 A1  Mar. 24, 2005

(30) Foreign Application Priority Data
Sep. 13, 2001  (DE) .................... 101 45 218

(51) Int. Cl.
*G06F 13/00* (2006.01)
(52) U.S. Cl. ............................................. 710/33
(58) Field of Classification Search ............. 307/368; 702/79, 89, 176, 187; 710/6, 18, 29, 32–33, 710/48, 61, 107, 117, 305
See application file for complete search history.

(56) References Cited

U.S. PATENT DOCUMENTS

| | | | | |
|---|---|---|---|---|
| 5,689,507 A * | 11/1997 | Bloks et al. | .................... | 370/389 |
| 5,751,721 A | 5/1998 | Bloks | ........................... | 370/509 |
| 5,819,111 A * | 10/1998 | Davies et al. | ................... | 710/29 |
| 5,887,029 A | 3/1999 | Husted et al. | | |
| 5,896,552 A | 4/1999 | Kowert et al. | .................. | 710/55 |
| 5,944,840 A | 8/1999 | Lever | .............................. | 714/34 |
| 5,991,307 A * | 11/1999 | Komuro et al. | ............... | 370/473 |
| 6,111,888 A * | 8/2000 | Green et al. | ................... | 370/461 |
| 6,789,182 B1 * | 9/2004 | Brothers et al. | ................ | 712/30 |
| 7,009,995 B1 * | 3/2006 | Bohrer et al. | ................... | 370/460 |
| 2001/0021196 A1 | 9/2001 | Weigl et al. | .................... | 710/444 |
| 2001/0038618 A1 * | 11/2001 | Otterbach et al. | ............ | 370/335 |
| 2003/0131171 A1 * | 7/2003 | Weigl et al. | .................... | 710/305 |

FOREIGN PATENT DOCUMENTS

| | | |
|---|---|---|
| DE | 100 00 305 A1 | 7/2001 |
| DE | 100 00 303 A1 | 8/2001 |
| DE | 100 00 304 A1 | 9/2001 |
| DE | 100 00 302 A1 | 7/2003 |
| EP | 1115219 | 7/2001 |

OTHER PUBLICATIONS

< URL: http://www.changnam.com/files/newproduct/T89C51CC01.pdf > Atmel Wireless & MC, T89C51CC01, "Enhanced 8-Bit MCU With CAN Controller and Flash", Online! 10, Oct. 10, 2000.

* cited by examiner

*Primary Examiner* — Chun-Kuan Lee
(74) *Attorney, Agent, or Firm* — Kenyon & Kenyon LLP

(57) ABSTRACT

A method and device for time determination in a bus system and a bus system having at least two users which are connected via a communication link are provided, where at least one user stores a specifiable base time in at least one memory, in particular a register, when an event occurs on the communication link whose moment of occurrence is to be determined.

8 Claims, 2 Drawing Sheets

METHOD AND DEVICE FOR DETERMINING TIME IN A BUS SYSTEM AND CORRESPONDING BUS SYSTEM

FIELD OF THE INVENTION

The present invention relates to a method and a device for determining time in a bus system having at least two users which are connected via a communication link, and a corresponding bus system.

BACKGROUND INFORMATION

Interconnection of control units, sensors, and actuator devices via a communication system has increased markedly in recent years in the construction of modern motor vehicles and machines, in particular in the area of machine tools and in automation. Synergy effects can be achieved by distributing functions over a plurality of control units. Such configurations are referred to as distributed systems. Communication between different stations is taking place increasingly via a bus. The communication traffic on the bus, access and reception mechanisms, and error handling are regulated by a protocol. Bus-specific elements of control units, sensors and actuator devices, referred to below as users, in combination with the communication network, are referred to below as a bus system.

An established protocol in the motor vehicle field is the CAN (Controller Area Network). This is an event-driven protocol; that is, protocol activities such as transmission of a message are initiated by events that originate outside of the communication system. Unambiguous access to the communication system or bus system is resolved through priority-based bit arbitration. This requires assignment of a unique priority to each message. The CAN protocol is very flexible; additional nodes and messages can be added readily, as long as there are still free priorities (message identifiers) available. The collection of all of the messages to be transmitted on the network including priorities and their sender nodes, and possibly reception nodes, are stored in a list known as the communication matrix.

An alternative to event-driven, spontaneous communication is the purely time-controlled approach. All communication activities on the bus are strictly periodic. Protocol activities such as transmission of a message are triggered only after the elapse of a time applicable to the entire bus system. Access to the medium is based on the allocation of time ranges in which a transmitter has exclusive transmission rights. The protocol is comparatively inflexible; adding new nodes is only possible when the corresponding time ranges have already been released beforehand. This circumstance forces the order of messages to be set already before start-up. A timetable is therefore created, which must fulfill the requirements of the messages in regard to repetition rate, redundancy, deadlines etc. This is known as the "bus schedule." The positioning of the messages within the transmission periods must be synchronized with the applications that produce the contents of the messages, in order to keep the latencies between application and moment of transmission to a minimum. Failure to perform this synchronization would destroy the advantage of time-controlled transmission (minimal latency jitter when transmitting the message over the bus). Thus, the demands on the planning tools are high.

The approach to time controlled CAN shown in German Published Patent Applications Nos. 100 00 302, 100 00 303, 100 00 304 and 100 00 305, the so-called TTCAN (Time Triggered Controller Area Network), satisfies the requirements for time-controlled communication sketched out above, as well as the demands for a certain measure of flexibility. TTCAN meets these demands by structuring the communication round (basic cycle) in exclusive time windows for periodic messages of specific communication participants, and in arbitration time windows for spontaneous messages of multiple communication participants.

The bus system may be implemented as a TTCAN, although this is not to be understood as restrictive in regard to the present invention. Rather, the object of the invention explained later may also be employed for additional comparable bus systems.

In the context of a TTCAN network, German Published Patent Application No. 100 00 305 shows a method and a device for exchanging data in messages between at least two bus users which are connected by a bus system, where the messages containing the data are transmitted over the bus system by the users and each message contains an identifier that characterizes the contained data, with each user deciding on the basis of the identifier whether it will receive the message. At the same time, the messages are time-controlled by a first user by having the first user transmit a reference message repeatedly over the bus in at least one specified time interval, and the time interval is subdivided into time windows of specifiable length, with the messages being transmitted in the time windows.

SUMMARY OF THE INVENTION

The present invention proposes a method and a device for time determination in a bus system having at least two users which are connected via a communication link, such that at least one user stores a specifiable base time in at least one memory if an event occurs on the communication link whose moment of occurrence is to be determined.

Advantageously, the named bus system is a time triggered controller area network, a so-called TTCAN system. In a first embodiment, the event whose moment of occurrence is being determined triggers a signal change at an interface of a user to the communication link, which may be of the at least one user that determines the time; when this signal change occurs, the specifiable base time or time base is stored in the memory at that moment. In another embodiment, the event whose moment of occurrence is being determined results in a specifiable signal level at an interface to the communication link of the at least one user that determines the time; then, when the specifiable signal level appears, the specifiable base time is stored in the memory. Various times of the network, in particular of the TTCAN network, may be used here as the base time or time base, for example the local time, the global time or the cycle time.

In the case of local time, each user has a local time, the base time in each case corresponding to the local time of the user that determines the time. If one user in the network or bus system is designated as the time master, the local time of this user is utilized as the global time for the entire bus system; this global time may also be used advantageously as the base time for all users in regard to time determination. As stated in the related art, the messages are transmitted via the communication link in such a way that a reference message of a user is transmitted in a specifiable time interval, the specifiable time interval corresponding to the cycle time in the network or bus system, where the time interval is subdivided into time windows of specifiable length in which the messages are transmitted, and as an additional possibility this cycle time may be utilized as the base time for time determination.

In another embodiment, a plurality of base times may be stored sequentially in one or more memories, so that, when each base time is assigned to an event, a plurality of times of events or a plurality of times of one event are determinable sequentially.

In another embodiment, a plurality of base times are stored simultaneously in a plurality of memories, so that a plurality of times of events may be determined simultaneously.

In a particular embodiment, at least one event produces an input signal in the at least one user that determines the time; the storing of the base time in the memory may be triggered by one or more input signals, in particular different input signals.

Advantageously, the base time or time base for determining time for the bus system either may be fixedly specified or may be variably specifiable for example from among the three possible time bases local time, cycle time and global time, in particular, specifiable from a plurality of time bases.

Thus the object of the present invention describes a general method including a device and bus system, for using a time base of an autonomous protocol controller, in particular that of a TTCAN protocol controller, to measure times which are synchronized to the network, in particular the TTCAN bus system, and which are independent of the processor and of software latency times.

This method also permits a time measurement synchronized to the network or the bus system, using simple means.

Thus, in interconnected control units, for example in automation, in a motor vehicle or in other areas of application it is possible to measure times in one or more nodes or users of the network, which are then present in the units of the network time according to the time base. It is also possible to measure times that are independent of the response time with which the software in the control unit responds to an event that indicates a moment to be measured.

DETAILED DESCRIPTION

The method, the device, and the bus system in conjunction with which the moment at which a particular event occurs is measured, referenced to the corresponding time base, is described in the following on the basis of the exemplary embodiments. The measurement is made autonomously, without direct control by the processor.

Figure 1:
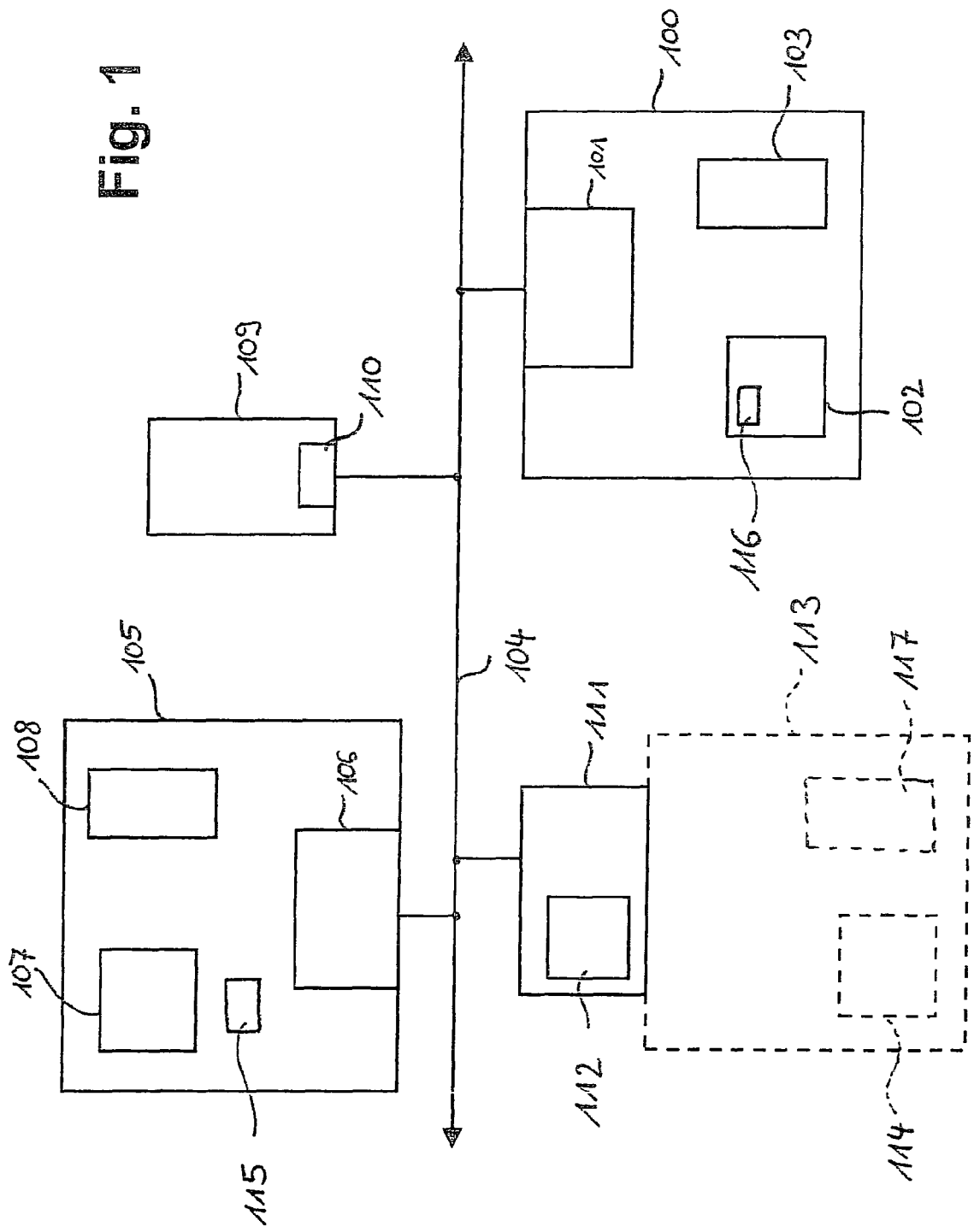
FIG. 1 shows a network environment or bus system, in particular a TTCAN network having a plurality of users.

According to the present invention, a time base which is to be used for measuring is copied into a memory, in particular into a register. The event whose moment of time is to be measured produces, for example, a signal change at an input signal of a bus user, in particular the user that measures the time, which triggers the copying process, i.e., the storage of the time base in the memory. FIG. 1 shows a communication link 104 with at least two users 105 and 100. User 100 is connected to the communication network or bus 104 via an interface element 101. User 100 may be a complete control unit, or an integrated circuit for coupling to the communication network or bus 104 in particular a protocol controller. Also included in addition to the interface element 101 are, for example, a processor 102 and a memory unit 103, which may be implemented as a bank of registers. User 105, like user 100, may be an element in the form of an integrated circuit, in particular a protocol controller in the TTCAN network or a control unit or an arithmetic unit. Also contained in IC 105 are an interface unit or interface element 106, a processing unit, in particular a processor 107, and a memory 108. The time base of users 100 and 105 is determined by an optionally synchronizable timer. The latter, like component 115, may be contained as a standalone unit in the user or integrated in the processor as shown by component 116 and processor 102. Such a timer 115 or 116 thus specifies the local time of the particular bus user 100 or 105. If bus user 105 is designated as the time master, then the local time specified by the timer 115 is thus used as the global time for the entire bus system, and is transmitted, for example, via reference messages, to the other bus users, so that the local time of the time master is the global time of all bus users.

In an example of a TTCAN system, the latter is based essentially on a time-controlled periodic communication which is timed by a timer, namely the user having the master time function, using a time reference message or reference message. The period to the next reference message is known as the basic cycle and includes the cycle time. This basic cycle in turn is subdivided into N time windows (N∈∠), where each time window allows exclusive transmission of a periodic message of varying length. These periodic messages are then transmitted in a TTCAN controller by using time marks which are coupled to the passage of a logical and relative time.

However, TTCAN also allows provision for free time windows, these time windows being used for spontaneous messages in conjunction with arbitration on the bus, the arbitration schema being used according to CAN (Controller Area Network). Synchronization of the local time of the time master as global time with the particular internal local times of the individual users is thus provided for and efficiently implemented. There are thus three times present in the TTCAN system: the global time, the local time, and the cycle time. Referenced to the level in the TTCAN, there are thus two time bases available for selection at Level 1: the local time and the cycle time; at Level 2, the global time is additionally available. All three time bases may be used for measuring.

As mentioned above, the time base which is to be used for measuring, selectable for example from local time, cycle time or global time at the moment that is to be measured, is copied into a memory, such as a register. To that end, the named memories 103 and 108 may be used executably as register banks, or optionally a memory 109 coupled separately to the bus via interface unit 110 may be used as a central storage medium for time determination.

Also optional is an interface element 111 having integrated processing unit 112, which links for example communication network 104 with a control unit 113 having integrated additional processor 114. The functionality of time determination may also be performed by interface element 111 itself, which stores the time base corresponding to the event or moment to be determined, either in an internal memory of control unit 117 or central memory 109, or in a possible memory, not explicitly shown, within the interface.

The memories may have an internal structure such that a plurality of storage areas or a plurality of registers are used in order to determine a plurality of moments simultaneously or sequentially, so that the corresponding time base is written simultaneously or sequentially to a plurality of registers, in order to fix the moments that are being measured or determined. If the copying process is triggered by an input signal, it is also possible to use a plurality of input signals to trigger the writing of the time base, i.e. the copying process. Such a copying process may be triggered by a signal change from high to low or low to high for a digital or binary signal, or when a certain specifiable signal level is reached.

This may be accomplished via software, or for example with the help of a comparator circuit. Likewise, the time base used may be set as one of the previously mentioned parameters local time, cycle time or global time which are used correspondingly for measuring, to determine the time in the bus system, or the time base may be utilized as a function of an event or a signal. The time base may also be completely freely selectable, by choosing it freely from specified time bases such as local time, cycle time or global time.

Figure 2:
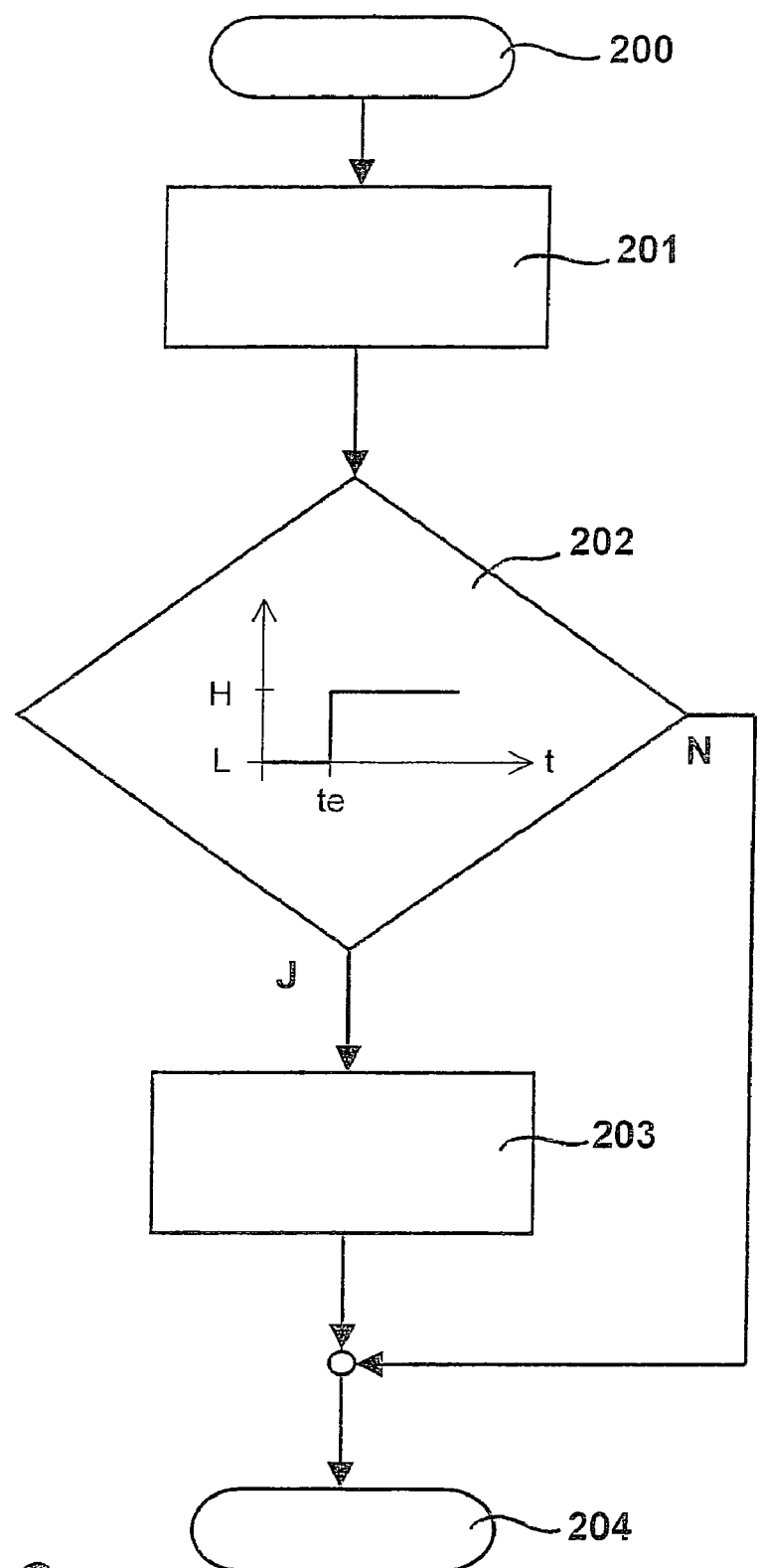
FIG. 2 shows an example of a process sequence according to the present invention for determining time on the basis of a flow chart.

The concrete procedural sequence for time determination is shown once more on the basis of FIG. 2. The procedure starts in block 200. In block 201 it is specified which network time base is to be used for time determination or what event is to be measured on the communication link. An event in this context may be a particular message which is transmitted, an interrupt in the system or in one user, or something similar. It is also possible in block 201 to review certain conditions in advance, i.e., before the copying function or storage procedure is triggered. These may be conditions such as a particular value in a register such as a value SWS in a TT clock control register, which must be greater than 0, and/or a value SWE for example in a TT interrupt vector register which must be 0, in order to store block 202 for example, the base time, in a corresponding register based on a rising flank at a trigger input.

The value SWS may be used to determine the base time itself, so that for a value W1 the cycle time is stored, for a value W2 the local time, or for a value W3 the global time. At the same time a value for SWS, for example value W0, e.g. 0, may turn off the storing or measuring function.

When only one memory or register is utilized, the value SWE may be used to determine whether a time measurement can or may be carried out. If the value SWE=0, as checked in block 201, the register is free and may be used. If the value SWE=1, a measurement has just taken place, and the content of the register may thereby be prevented from being overwritten. Hence the next time measurement or time determination is not possible until the value SWE is again set to 0, which occurs for example in block 203 after the measured time is evaluated.

In the above example, when there is a signal change from low to high at the moment TE of the event, the base time preselected through the value SWS is stored in a register, if the mentioned prerequisites are satisfied. If the register in block 203 to which the particular time has been written is read out, the next time determination may be enabled by resetting the value SWE to 0, and the procedure goes to the end of the procedure or to a restart in block 200 for the next time measurement.

To prevent endless waiting times and blocking of the register, it is also possible after a certain time has passed or when other interrupt conditions are met without the rising flank being reached, to skip immediately to the end of the procedure in block 204.

Like the rising flank, a falling flank or reaching a certain signal level may also be chosen as the criterion for storing. The possibility of choice given by the value SWS in block 201, i.e., the particular time base, is optional. A particular time base may also be set in general for measuring time. Through the use of various values for SWE, switching between various registers may also be enabled. For example, an empty register into which a time base may be written may be set by default to a certain value, and a different value specifies the switch to a different register.

In this way it is possible for the moments of occurrence of various events to be determined by writing different or same time bases to different registers. By using a plurality of registers and assigning identifiers for individual registers, it is also possible for simultaneously occurring moments of different events to be registered simultaneously, so that the moments are determined through the assignment to the corresponding events.

It is thus possible advantageously to measure the moment exactly at which a particular input signal or event of an autonomous TTCAN protocol controller changes. The precision of the measurement does not depend on how quickly the processor is able to respond to the change of an input signal and how quickly the processor is able to read the time base of the TTCAN protocol. The measurement may also be referenced to the global time, which is calibrated automatically throughout the network in TTCAN level 2, independently of the local processor timing. That provides a simple and effective possibility for determining times in the bus system without additional demands on the processor, in particular for the TTCAN but also for other comparable bus systems.

What is claimed is:

1. A method for implementing a stop-watch function for determining time in a bus system which utilizes time triggered controller area network protocol and includes at least two users which are connected via a communication link, comprising:
   detecting an event whose time of occurrence is to be determined, wherein the event occurs one of on the communication link and at a trigger input of at least one user;
   triggering, when the event occurs, a signal change at an interface to the communication link of the at least one user;
   storing, in at least one memory of the at least one user, a specified base time when the signal change occurs; and
   performing time measurement in the bus system using the base time;
   wherein the base time is selected from a plurality of time bases including (i) a global time of the bus system, (ii) a cycle time of time triggered controller area network protocol, and (iii) a local time of one of the at least two users.

2. The method of claim 1, wherein:
   the base time is stored in the at least one memory when an end of a signal appears at a trigger input of the user as the event whose time of occurrence is to be determined.

3. The method of claim 1, further comprising:
   storing a plurality of base times sequentially in a plurality of memories;
   assigning each base time that is stored in a memory to an event; and
   determining sequentially at least one of a plurality of times of events and a time of one event.

4. The method of claim 1, further comprising:
   storing a plurality of base times simultaneously in a plurality of memories;
   assigning each base time stored in a memory to an event; and
   simultaneously determining a plurality of times of events.

5. The method of claim 1, wherein:
   the time of occurrence of the event is determined using a specified signal level at an interface to the communication link of the at least one user; and
   the base time is stored in the at least one memory when the specified signal level occurs.

6. The method of claim 1, wherein:
triggering the signal change at the interface to the communication link of the at least one user includes generating an input signal; and
the base time is stored in the at least one memory when the input signal is generated.

7. A device for implementing a stop-watch function for determining time in a bus system which utilizes time triggered controller area network protocol and includes at least two users which are connected via a communication link, comprising:
 a first arrangement configured to recognize an event whose moment of occurrence is to be determined, wherein the event occurs one of on the communication link and at a trigger input of at least one user;
 at least one memory; and
 a second arrangement configured to trigger, when the event occurs, a signal change at an interface to the communication link of the at least one user, and to store at least one specified base time in the at least one memory when the signal change occurs;
 wherein the base time is selected from a plurality of time bases including (i) a global time of the bus system, (ii) a cycle time of time triggered controller area network protocol, and (iii) a local time of one of the at least two users.

8. A device for a bus system for implementing a stop-watch function for determining time in the bus system which utilizes time triggered controller area network protocol, the bus system including at least two users which are connected via a communication link, the device comprising:
 a first arrangement configured to recognize an event whose moment of occurrence is to be determined, wherein the event occurs one of on the communication link and at a trigger input of at least one user;
 at least one memory; and
 a second arrangement configured to trigger, when the event occurs, a signal change at an interface to the communication link of the at least one user, and to store at least one specified base time in the at least one memory when the signal change occurs;
 wherein the base time is selected from a plurality of time bases including (i) a global time of the bus system, (ii) a cycle time of time triggered controller area network protocol, and (iii) a local time of one of the at least two users.

* * * * *